UNITED STATES PATENT OFFICE.

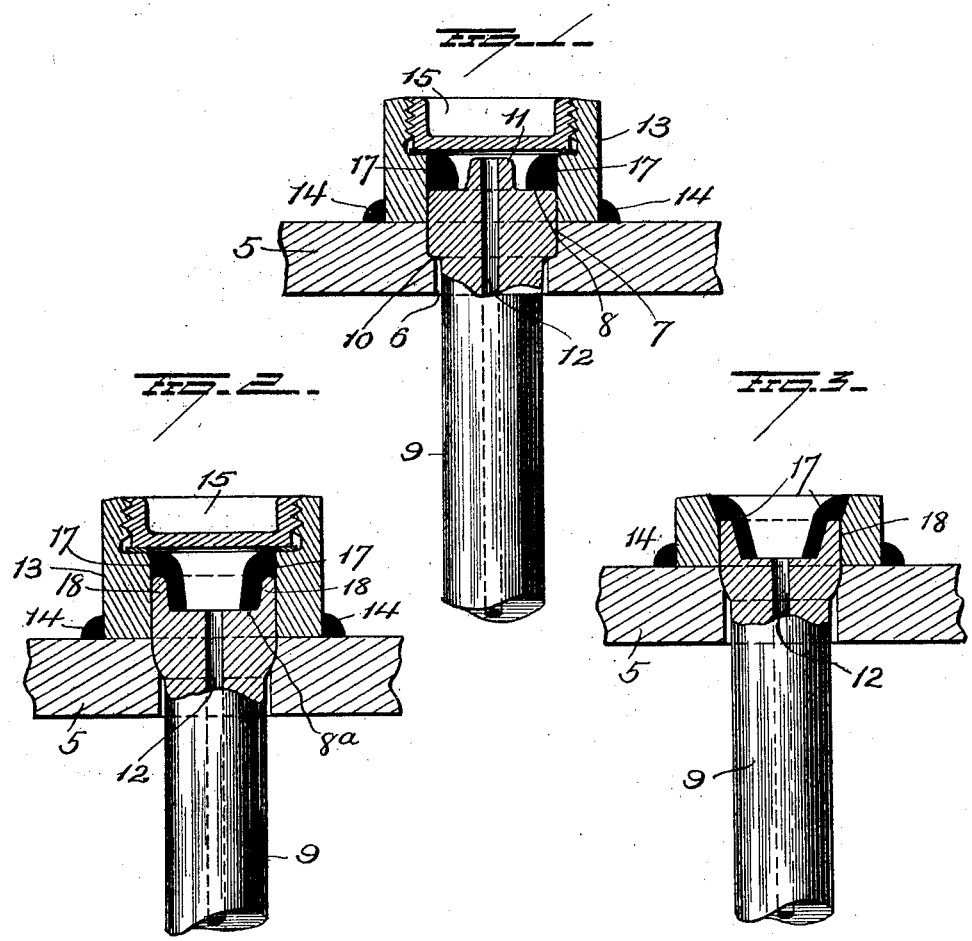

JOHN ROGERS FLANNERY, OF PITTSBURGH, PENNSYLVANIA, AND ETHAN I. DODDS, OF CENTRAL VALLEY, NEW YORK, ASSIGNORS TO FLANNERY BOLT COMPANY, OF PITTSBURGH, PENNSYLVANIA.

STAYBOLT STRUCTURE.

1,400,536.   Specification of Letters Patent.   Patented Dec. 20, 1921.

Application filed January 27, 1921. Serial No. 440,423.

*To all whom it may concern:*

Be it known that we, JOHN ROGERS FLANNERY and ETHAN I. DODDS, citizens of the United States, and residents of Pittsburgh and Central Valley, in the counties of Allegheny and Orange and States of Pennsylvania and New York, respectively, have invented certain new and useful Improvements in Staybolt Structures; and we do hereby declare the following to be a full, clear, and exact description of the invention, such as will enable others skilled in the art to which it appertains to make and use the same.

This invention relates to an improvement in staybolt structures, and more particularly to bolts having a continuous tell-tale longitudinally through the same to permit of the escape of steam in the event the bolt should break, and it consists in the parts and combination of parts as will be more fully explained and pointed out in the claims.

In the accompanying drawings; Figure 1 is a view in section of one embodiment of our invention and Figs. 2 and 3 are similar views of modifications of the same.

5 represents the outer sheet of a boiler, provided with a bolt opening 6, counterbored as at 7 to receive a part of the shank and the head 8 of the bolt 9, the head resting on the shoulder 10. The head is preferably cylindrical as shown, and conforms in diameter and shape to the counterbore 7 in the sheet so as to rest solidly therein, and may, as shown, project above the sheet, and is provided at its outer end with a centrally projecting teat 11. The tell-tale 12 extends throughout the length of the bolt and the teat 11, so that in the event of fracture of the bolt 9 the steam may escape at both ends, and the cylindrical head 8 preferably projects beyond the outer surface of the sheet 5 to form a support for the sleeve 13.

The inner end of the bolt 9 is secured to the inner sheet (not shown) in the usual and well known manner, and the sleeve 13 which surrounds the head, rests on the outer surface of the outer sheet and is secured thereto by a weld 14. The sleeve 13 is counterbored and is internally threaded at its outer end to receive the cap 15, and the sleeve and head of the bolt are welded to solidly lock the bolt in place, the teat on the head of the bolt preventing the welding material or compound from entering the tell-tale.

In the construction shown in Fig. 2 the counterbored portion of the sheet 5 is rounded or curved to receive the rounded or curved shoulder at the juncture of the head $8^a$ and the bolt 9, and the head instead of having a central teat as in Fig. 1 is recessed to form a peripheral flange 18 over which the welding material 17 is applied to secure it to the sleeve 13, the flange being sufficiently removed from the tell-tale so that the weld will not interfere with the latter. In this construction the sleeve is closed by a threaded cap as in Fig. 1.

The construction shown in Fig. 3 is like that shown in Fig. 2 except that the screw cap is omitted thus exposing the tell-tale and permitting the free escape of steam at the outer end in the event the bolt should break.

In locomotive boilers the heads of some of the bolts are exposed and in others they are covered with a lagging and jacket to prevent radiation of heat, hence in all locations where the bolt heads are covered we prefer to use a cap covering the tell-tale, otherwise the escaping steam at boiler pressure would destroy the lagging. In locations where the bolt head is exposed the cap may be dispensed with thus permitting the steam to escape at the outside as well as inside the fire box, and indicate instantly the location of the fractured bolt.

It is evident that many slight changes might be resorted to in the relative arrangement of parts shown and described without departing from the spirit and scope of our invention hence we would have it understood that we do not wish to confine ourselves to the exact construction and arrangement of parts shown and described but, Having fully described our invention what we claim as new and desire to secure by Letters-Patent, is:—

1. In staybolt construction, the combination of a boiler sheet having an opening for a staybolt and a counterbored seat for the head of the bolt, a bolt having a tell-tale extending longitudinally through the same and provided with a head seated in the counterbored seat in the sheet and a sleeve surrounding the head and welded to the latter, the sleeve also being secured to the boiler sheet.

2. In staybolt construction, the combination of a boiler sheet having an opening for a staybolt and a counterbored seat for the head of the bolt, a bolt having a tell-tale extending longitudinally through the same and provided with a head seated in said counterbored seat, a sleeve surrounding the bolt head and welded to the latter and also to the boiler sheet and a cap for closing the outer end of the sleeve.

3. In staybolt construction, the combination of a boiler sheet having an opening for a staybolt and a counterbored seat for the head of the latter, the head of the bolt having a centrally located outwardly projecting teat, the bolt having a tell-tale extending longitudinally through the same and also through the teat, and a sleeve surrounding the bolt head and secured to the latter and welded to the bolt head.

In testimony whereof, we have signed this specification in the presence of a subscribing witness.

JOHN ROGERS FLANNERY.
ETHAN I. DODDS.

Witness:
EDWIN S. RYCE.